No. 692,977. Patented Feb. 11, 1902.
E. T. BRANNAN.
CARVING MACHINE.
(Application filed Apr. 15, 1901.)
(No Model.)
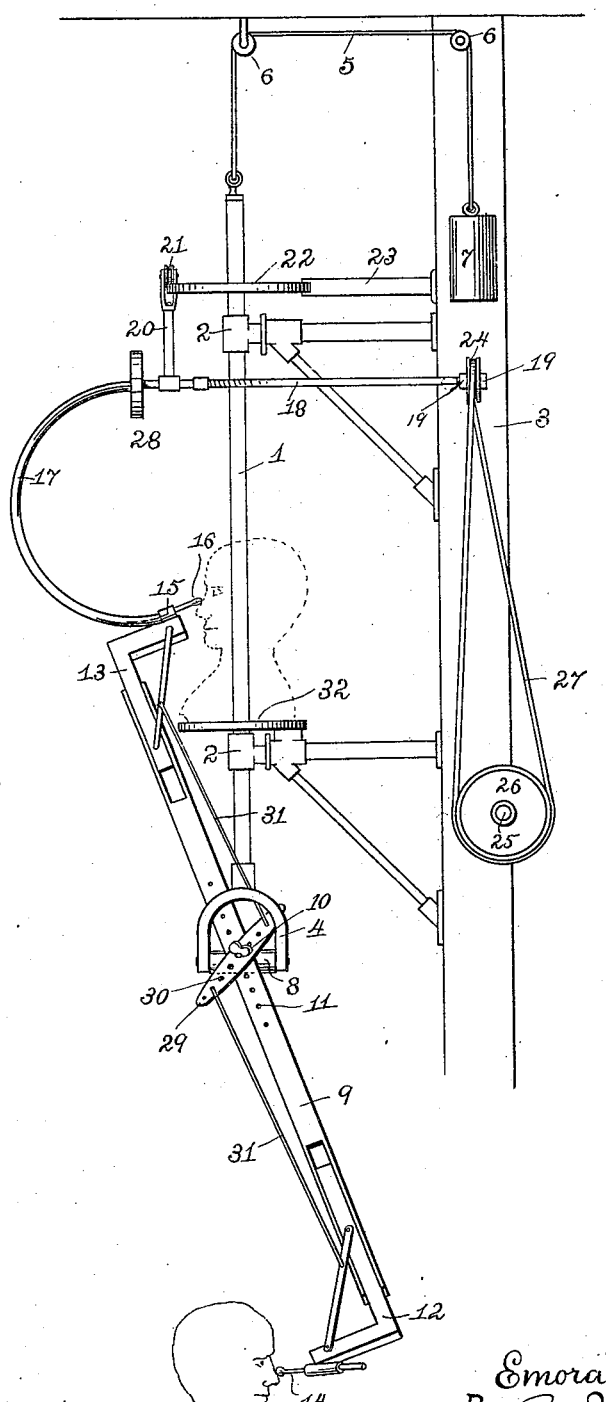
Witnesses
Maybelle F. Garner
M. O. Buckingham
Inventor
Emora T. Brannan,
By Jas. H. Vermilya
Attorney

UNITED STATES PATENT OFFICE.

EMORA THOMAS BRANNAN, OF BALTIMORE, MARYLAND.

CARVING-MACHINE.

SPECIFICATION forming part of Letters Patent No. 692,977, dated February 11, 1902.

Application filed April 15, 1901. Serial No. 55,898. (No model.)

*To all whom it may concern:*

Be it known that I, EMORA THOMAS BRANNAN, of Baltimore, State of Maryland, have invented a new and useful Improvement in Carving-Machines, of which the following is a full, clear, and exact description, reference being had to the accompanying drawing, making part of this specification.

My invention is an improved carving-machine to mechanically aid in the modeling from life or copying of an object, as a piece of statuary or the like, and in the production of a work either of the same size or larger or smaller, as may be desired, than the original or model; and it consists in the peculiar construction and combination of devices, hereinafter fully set forth, and particularly pointed out in the claims.

The accompanying drawing is an elevation of a modeling or pointing machine constructed in accordance with my invention.

A vertically-disposed and vertically-movable shaft 1 is adapted to move in suitable supports 2, which are here shown as brackets attached to a post or standard 3. At the foot of the shaft is a stirrup 4, and said shaft is supported by a cord 5, which passes over direction-sheaves 6. The said cord is attached to a weight 7, which serves to counterbalance the shaft and its attachments and maintain the shaft in any desired vertical adjustment. The stirrup has a revoluble member 8, which is adapted to turn axially, and to the said revoluble member is pivotably attached a mobile bar 9 by a pivot-screw 10, which may be disposed in either of a series of adjusting-openings 11, with which the mobile bar is provided. Said mobile bar carries at its ends arms or frames 12 13, which slide therein and are extensible therefrom. The arm or frame 12 carries a point 14. The arm or frame 13 is provided with a bearing 15 for a revoluble edged cutting-tool 16, which is attached to and rotated by a flexible shaft 17, which may be driven by power by any suitable means. As here shown, said flexible shaft is attached to a shaft 18, which is journaled in bearings 19 on the post 3 and is also journaled in a bearing in the lower end of a hanger 20, which is supported by a trolley-wheel 21, that runs on a ring 22. The latter is concentric with the vertical shaft and is supported by any suitable means, being here shown as supported by a bracket-arm 23, that is attached to post 3. Shaft 18 has a pulley 24. A power-driven shaft 25 has a pulley 26. An endless belt 27 connects the said pulleys, and thereby communicates power to shaft 18 and flexible shaft 17. The latter is here shown as provided with a fly-wheel 28.

An oscillating bar 29, which is provided with a series of adjusting-openings 30, is pivoted on the mobile bar 9 by the screw 10, the latter being placed in an appropriate opening 30. Rods 31 connect the oscillating bar 29 to the frames or arms 12 13. Hence when the point 14 is moved to trace the outline of the original, model, or subject the cutting-point 16 is correspondingly moved and is caused to impart a corresponding outline to the work, which is supported on a table 32.

Any suitable tracing or cutting point may be attached to the frame or arm 13. The machine is adapted for working in clay, chalk, marble, granite, or other suitable material. The mobile bar being carried by the vertically-movable shaft may be raised and lowered, together with the guiding or tracing and cutting points, and said mobile bar being pivoted on a revoluble member of the stirrup may be manipulated by the operator to cause the guiding-point, and hence the cutting-point also, to conform to any outline, however irregular.

Having now described my invention, what I claim as new, and desire to secure by Letters Patent, is—

1. In a machine of the class described the combination of a movable supporting element having a revoluble member, a mobile bar pivotally attached to said revoluble member, extensible elements carried by said mobile bar at opposite ends thereof and adapted respectively for the attachment thereto of guiding and cutting points, an oscillating bar on said mobile bar, and connections between said oscillating bar and said extensible elements, substantially as described.

2. The combination of a vertically-movable counterweighted shaft, a revoluble element carried thereby, a mobile bar pivoted to said revoluble element, an oscillating bar on said mobile bar, point-carrying elements longitudinally movable on said mobile bar and connections between said tool-carrying elements and said oscillating bar, substantially as described.

3. In combination with a movable support, a mobile bar universally jointed thereto, an oscillating bar pivoted to and adjustable on said mobile bar, tool-carrying elements carried by said mobile bar, and connections between said point-carrying elements and said oscillating bar, substantially as described.

In testimony whereof I have set my hand, this 11th day of April, A. D. 1901, in the presence of two attesting witnesses.

EMORA THOMAS BRANNAN.

Witnesses:
J. MORRIS OREM,
W. DEVRIES GOODWIN.